United States Patent [19]

Tache et al.

[11] Patent Number: 5,245,401
[45] Date of Patent: Sep. 14, 1993

[54] SYSTEM FOR LOCATING FRESNEL REFLECTIONS ALONG AN OPTICAL FIBER

[75] Inventors: Jean-Paul Tache, Mornant; Christian Forissier, Saint Chamond, both of France

[73] Assignee: Alcatel Cable, Clichy Cedex, France

[21] Appl. No.: 833,782

[22] Filed: Feb. 12, 1992

[30] Foreign Application Priority Data

Feb. 13, 1991 [FR] France .................. 91 01665

[51] Int. Cl.$^5$ ............................................. G01N 21/88
[52] U.S. Cl. ................................................ 356/73.1
[58] Field of Search ....................................... 356/73.1

[56] References Cited

U.S. PATENT DOCUMENTS

| 4,021,121 | 5/1977 | Schicketanz | 356/237 |
| 5,066,118 | 11/1991 | Buerli | 356/73.1 |

FOREIGN PATENT DOCUMENTS

| 3903490 | 8/1989 | Fed. Rep. of Germany | 356/73.1 |
| 3927293 | 8/1990 | Fed. Rep. of Germany | |
| 2517826 | 6/1983 | France | |

OTHER PUBLICATIONS

Patent Abstracts of Japan, vol. 14, No. 321 (P-1074)(4264), Jul. 10, 1990; & JP-A-2 105 033 (Fujikura).

Laser Focus, vol. 24, No. 12, Dec. 1988, Tulsa, US, pp. 129–134; S. K. Das et al.: "Optical Time-Domain and CW techniques measure lightwave reflectance.".

*Primary Examiner*—Vincent P. McGraw
*Attorney, Agent, or Firm*—Sughrue, Mion, Zinn, Macpeak & Seas

[57] ABSTRACT

A system for locating Fresnel reflections along an optical fiber, including an emission circuit for emitting optical pulses which are coupled into the input face of the fiber; a reception and transformation circuit (20) for receiving signals reflected by the fiber and transforming them into electrical signals; a selection circuit (20) for taking the electrical signals and selecting therefrom only those electrical signals which correspond to Fresnel reflections; a comparison circuit (23, 25, 26) coupled to the selection circuit (20) and receiving a comparison reference signal expressing the rank of an arbitrarily-chosen one of the Fresnel reflections; and an evaluation circuit (13, 21, 22, 24, 26) coupled to the comparison circuit (23,25,26) and to the selection circuit (20) so as to locate the point along the fiber that gave rise to the arbitrarily-chosen Fresnel reflection.

13 Claims, 3 Drawing Sheets

SYSTEM FOR LOCATING FRESNEL REFLECTIONS ALONG AN OPTICAL FIBER

BACKGROUND OF THE INVENTION

The present invention relates to a system for locating Fresnel reflections along an optical fiber, which system is designed in particular for measuring the lengths of optical fibers and for locating breaks along such fibers, in particular for applications to maintenance of communications cables.

In response to a light pulse sent along an optical fiber, two types of reflection are received at the input of the fiber:

reflections due to Rayleigh backscattering on the silica crystals; the maximum light power of these reflections is about 40 dB below the light power of the incident pulse; and reflections due to ends (the front face and the rear face) of the fiber, and to the highly-reflective connectors situated along the fiber: these are Fresnel reflections; the maximum power of these reflections is about 14 dB below the light power of the incident wave.

In order to measure the length of an optical fiber (or to locate the position of a break, which comes to the same), it is necessary to detect the Fresnel reflection due to the rear face of the fiber under test.

Two methods may be used.

The first method uses the principle of reflectometry, based on Rayleigh backscattering. A light pulse is injected along an optical fiber to be tested, in general via a "lead-in fiber" whose exact length is known, and which is welded onto the front face of the fiber to be tested. The Fresnel reflection due to the front face of the fiber is of very high amplitude because the light constituting the reflection has not penetrated into the fiber, and consequently has undergone almost no attenuation. This leads to saturation of the detection system of the reflectometer. During the desaturation time, also referred to as the "dead period", no signal can be detected, and this is naturally detrimental to the correct operation of the apparatus. The object of using a lead-in fiber of sufficient length to enable desaturation is to mitigate this problem.

The signals reflected by the fiber then enable the reflectometry curve to be drawn. A reflectometry curve (see FIG. 1) gives the attenuation A in dB along the fiber as a function of the distance d (in km). Both of the above-mentioned types of reflection appear on curve 1. The flat portions 2, 3, and 4 correspond to the Rayleigh backscattering due to the silica crystals. The peaks 6 and 7 correspond to the Fresnel reflections due to the reflective connectors situated along the fiber or along the lead-in fiber. The peak 5 corresponds to the Fresnel reflection due to the front face of the fiber. The peak 8 corresponds to the Fresnel reflection due to the break in the fiber.

Reflectometry apparatuses are mainly used to determine attenuation characteristics of optical fibers. It is also possible to use reflectometry to locate points along an optical fiber that have given rise to Fresnel reflections. However, this use poses several problems.

Firstly, the coupled optical power injected into the fiber must be sufficient for the backscattered energy (which is at −40 dB) to be detected. The power injected is directly proportional to the area of the laser pulse. Since it is not possible to increase the power emitted by the laser without limit, it is necessary to work with wide pulses so as to obtain the desired optical power. However, the distance resolution of the apparatus is better when the pulse is narrow. The need for a minimum emission power threshold implies a poor distance resolution (of about 1 meter (1 m)) and a dead period equivalent to about 40 m.

Furthermore, once the reflectometry curve is displayed on the screen of the apparatus, in order to locate the point that gave rise to a Fresnel reflection, an identification cursor must be displaced to the start of the rise of the Fresnel peak under study. For reasons of clarity, the curve 1 shown in FIG. 1 is actually an expanded view of the curve obtained in practice, and what is really seen at each Fresnel peak is a portion of curve such as that shown in FIG. 2. It is therefore necessary to expand the horizontal scale at the Fresnel peak under study, in order to place the cursor exactly at the start of the rise of the peak. Once these two operations have been performed, the desired distance is obtained by means of a function integrated in the apparatus.

In order to determine the distance between two points that gave rise to Fresnel reflections, the measuring principle is similar and two cursors are placed at respective ones of the two peaks under study.

In this way, firstly, the distance measurements are not taken in real time, but rather after the curve has been displayed and after analog-to-digital conversion of the signal so that it can be processed by a microprocessor, and secondly, the remaining operations take a relatively long time and require qualified personnel. Therefore, it is inconvenient to use a reflectometer for quick on-site checks, particularly since it is an apparatus that is bulky, very costly, and designed, in fact, to supply characteristics (overall assessment) of the fiber that are not useful when maintaining communications cables, at which stage the essential requirement is to detect a break in a link (equivalent to an ohmmeter for copper wire). Therefore, the reflectometer is not the most suitable apparatus.

It is possible to use a second method for detecting Fresnel peaks, based on the echometry principle. In echometry, only the Fresnel peaks are taken into consideration, i.e. reflections are detected only if above a certain threshold. Therefore, it is no longer essential to inject optical power as high as in reflectometry. Consequently, narrow pulses can be used, thereby giving the apparatus a small dead period (equivalent to about 2 m) and contributing to obtaining good distance resolution (of about 25 cm).

Given that only signals of detectable amplitude are retained, it is not necessary to use a sophisticated amplifier (bandwidth, gain, etc.), and this reduces the cost of the apparatus compared with a reflectometer.

The principle of echometry is as follows: a narrow high-amplitude laser pulse is injected into the input of the fiber (e.g. made of silica), or of the lead-in fiber, and at the same time clock counting is triggered. The first Fresnel reflection that is detected stops the counting. Given the refractive index of the silica making up the fiber, and on the basis of the time indicated by the clock, a microprocessor calculates the distance between the front face of the fiber and the first point of the fiber that gives rise to a Fresnel reflection. This measurement is taken in real time (the time counted by the clock is automatically and simultaneously transformed into length by the apparatus, in about one second).

The problem with using such an apparatus can thus be seen: if the fiber under test does not include any reflective connectors, then the Fresnel peak detected does indeed correspond to the rear face of the fiber; but if the fiber has connectors before its rear face, then it is impossible to detect the corresponding Fresnel peaks because the clock will have been inhibited after the return of the first Fresnel reflection due, to the first connector.

SUMMARY OF THE INVENTION

Therefore, an object of the present invention is to implement a system for locating Fresnel peaks along an optical fiber, which system enables measurements to be taken quickly, and in particular measurements of fiber lengths (in particular, in order to detect breakage) in the presence of reflective connectors. Furthermore, an object of the present invention is to implement such a system that is simple to use, cheap, and compact for use, for example, on sites on which optical fiber cables are being laid or for maintenance in a wired building.

To this end, the present invention provides a system for locating Fresnel reflections along an optical fiber, said system being characterized in that it comprises:

emission means for emitting optical pulses which are coupled into the input face of said fiber;

reception and transformation means for receiving signals reflected by said fiber and transforming them into electrical signals;

selection means for taking said electrical signals and selecting therefrom only those electrical signals which correspond to Fresnel reflections;

comparison means coupled to said selection means and receiving a comparison reference signal expressing the rank of an arbitrarily-chosen one of said Fresnel reflections; and evaluation means coupled to said comparison means and to said selection means so as to locate the point along said fiber that gave rise to said arbitrarily-chosen Fresnel reflection.

According to an important characteristic, the emission means comprise a laser controlled by an electrical pulse generator, and an optical coupler placed between the laser and the input face of the fiber, each pulse from the generator further triggering the start of counting of a high-frequency clock.

According to another important characteristic, at the reception and transformation means, the selection means include a minimum amplitude threshold which the electrical signals must exceed in order to be transmitted to the comparison means, the threshold being greater than the amplitude of the electrical signal corresponding to the maximum power of Rayleigh backscattering.

Advantageously, the comparison means comprise a first counter whose output is sent to a comparator, and a microprocessor also connected to the comparator.

In addition, the evaluation means comprise:

a clock transmitting its pulses to a gate as from the first optical pulse;

a D-type bistable whose data input is connected to the reception and transformation means, whose clock input for enabling the data state is connected to the output of the comparison means, and whose output is applied to the gate; and a second counter whose input is connected to the gate and whose output is connected to a microprocessor.

According to a first operating method, in order to locate an arbitrarily-chosen one of the Fresnel reflections, the rank N of the Fresnel reflection preceding the chosen Fresnel reflection is encoded and entered in the form of a binary word, so that, with the gate being open since the first optical pulse was emitted:

when the $N^{th}$ Fresnel reflection is detected, the comparator enables the D-type bistable;

when the $N+1^{th}$ Fresnel reflection is detected, the corresponding electrical signal inhibits the gate, thereby stopping the second counter which then transmits the number of clock pulses it has received since the start to the microprocessor, the microprocessor then calculating the distance between the input face of the fiber and the point that gave rise to the chosen Fresnel reflection.

According to a second operating method, the microprocessor includes auxiliary means for locating a new Fresnel reflection of rank $N+P$ after having located the $N+1^{th}$ Fresnel reflection, by repeating the processing for the rank $N+P$ of the new Fresnel reflection, and by then determining by subtraction the distance between the points that gave rise to the chosen $N+1^{th}$ and $N+P^{th}$ Fresnel reflections.

Furthermore, it is possible to couple a lead-in optical fiber of known length to the input face of the optical fiber, which lead-in fiber receives the optical pulses which it transmits to the fiber under test.

The HF clock used may be a quartz clock; the reception and transformation means may be constituted by a photodiode. In addition, they may be equipped with a threshold amplifier for selecting the Fresnel reflections.

Finally, the system of the invention may include a subsystem for averaging a plurality of consecutive measurements, and means for effecting general resetting prior to emission of each new optical impulse that is injected into the fiber.

BRIEF DESCRIPTION OF THE DRAWINGS

Other characteristics and advantages of the present invention appear on reading the following description of apparatus using a system for locating Fresnel reflections of the invention, given by way of non-limiting example with reference to the following figures, in which.

DETAILED DESCRIPTION OF THE PREFERRED EMBODIMENTS

In these Figures, common components are given the same reference numbers.

Figure 1:
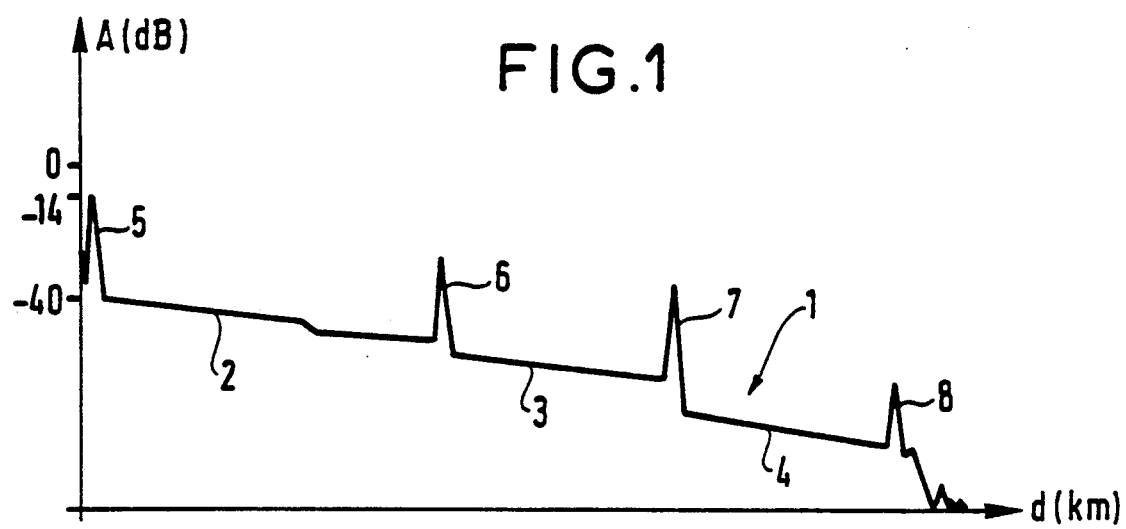
FIG. 1 shows a reflectometry curve.
Figure 2:
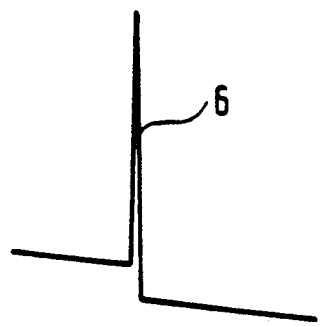
FIG. 2 shows a portion of a reflectometry curve.
Figure 3:
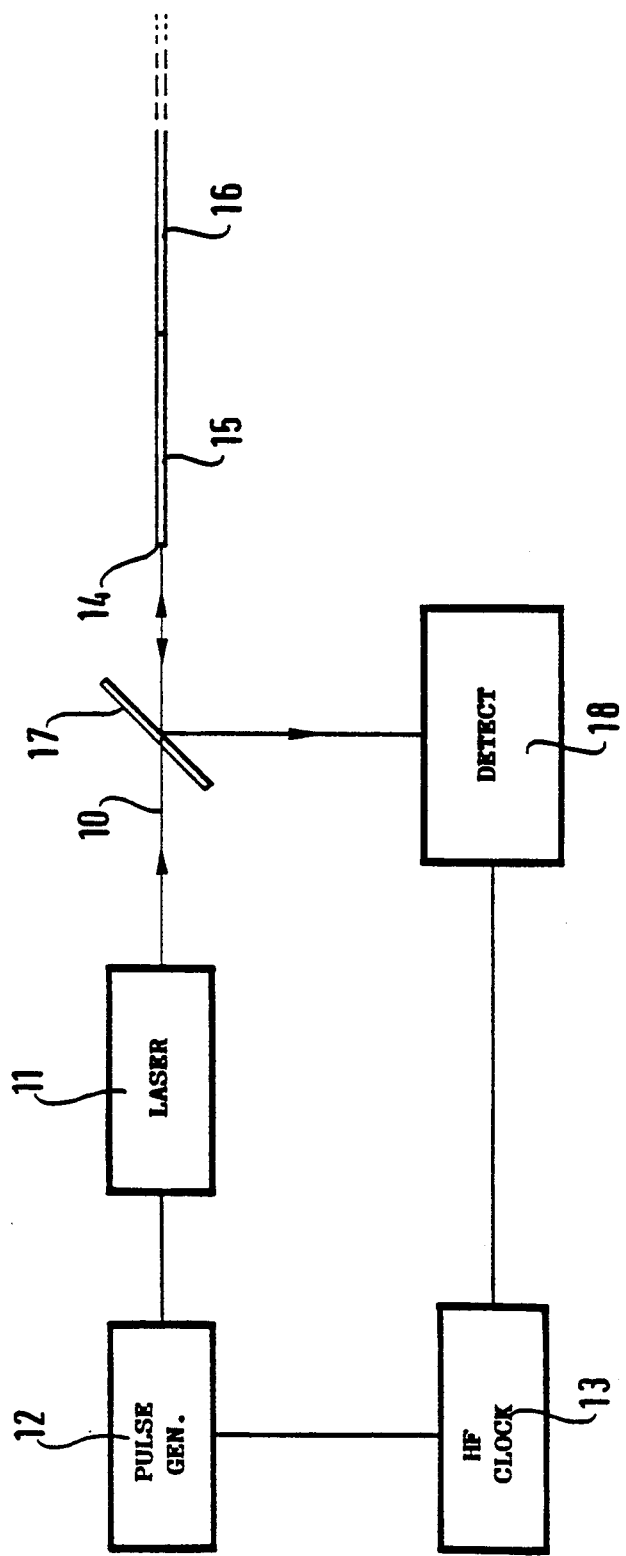
FIG. 3 is a block diagram showing apparatus of the invention.
Figure 4:
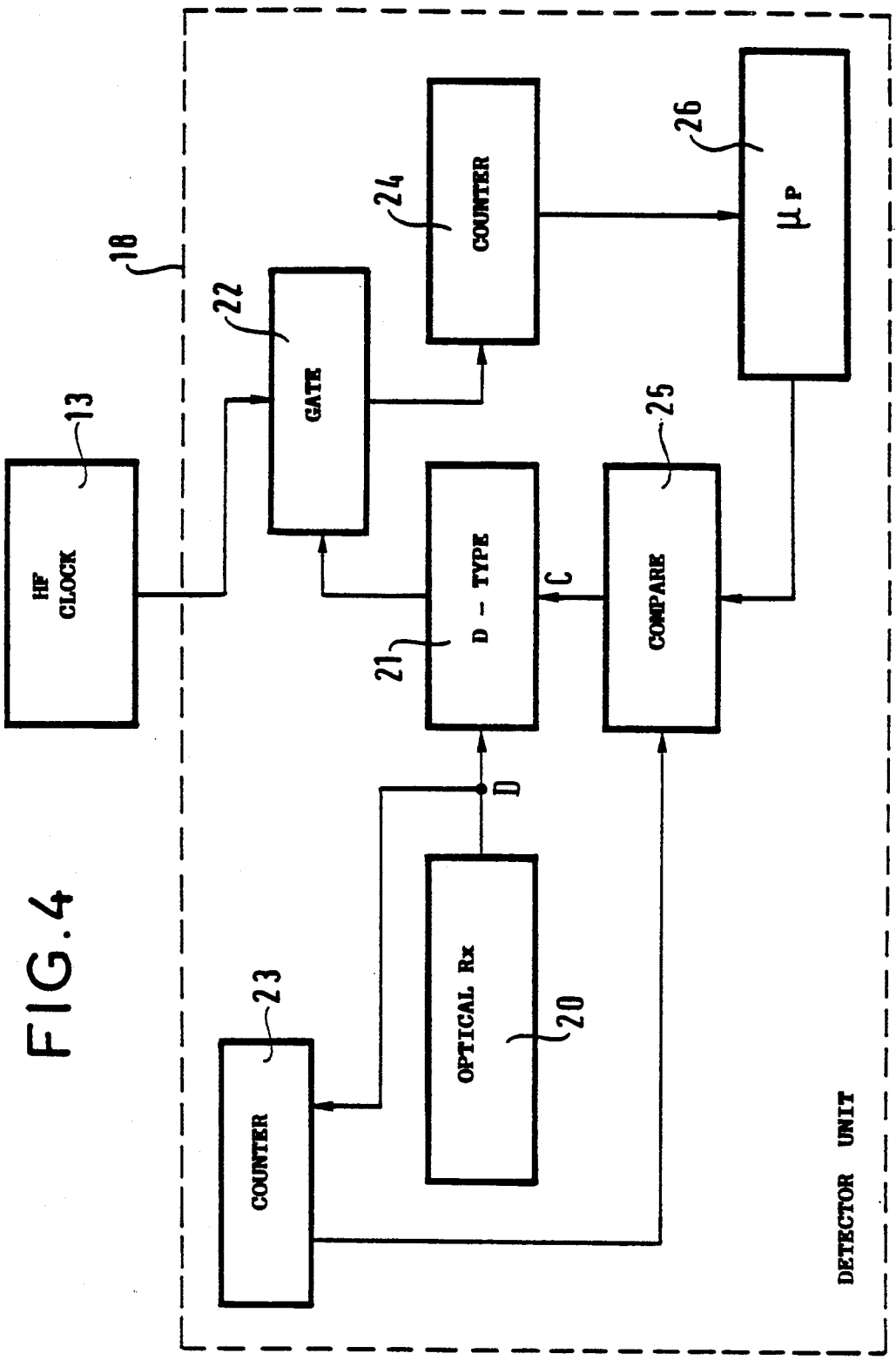
FIG. 4 is a block diagram showing the FIG. 3 detecting and measuring unit.

In FIG. 3, an incident optical pulse 10 is emitted by a laser 11 under the action of an electrical pulse generator 12 which also triggers counting of an HF clock 13. The pulse is applied to the input front face 14 of a lead-in fiber 15 via an optical coupler 17, which lead-in fiber is welded on an optical fiber 16. The resulting reflections are then directed onto a detecting and measuring system 18 by the coupler 17.

The detecting and measuring unit 18 includes in particular includes an optical receiver 20, e.g. such as a photodiode equipped with a threshold amplifier, a D-type bistable 21, a gate 22, two counters 23 and 24, a comparator 25, and a microprocessor 26.

The data input D of the bistable 21 is connected to the optical receiver 20, and the enabling clock input C of the bistable for accepting the data state is connected to the output of the comparator 25.

In order to enable the invention to be better understood, two operating methods of the implemented apparatus are described below by way of example.

Firstly, before using the apparatus for measuring, it is necessary to set the minimum detection threshold of the photodiode, so that backscattered signals are not detected. To do this, the reference that is taken is the power that is backscattered at the front face 14 after a light pulse. This power is the maximum backscattered power, which is measured by means of a reflectometer, for example. The detection threshold of the apparatus of the invention is then set once and for all to above this power level. In this way, only the Fresnel reflections are detected. The apparatus is then ready for use.

In a first operating method, it is possible to locate a given Fresnel reflection (e.g. ranked $N+1$, with $N>1$) relative to the front face of the fiber (or to the front face of the lead-in fiber of known length).

The value N is then entered in the memory of the microprocessor 26.

By means of manual control at the microprocessor, the first optical pulse is sent into the fiber. Simultaneously, the gate 22 is opened.

In this way, as from the first optical pulse, the clock 13 continuously transmits time-measuring pulses to the counter 24 via the gate 22. Optical pulses are injected into the fiber periodically, with a period that is long enough to enable the last Fresnel reflection due to the rear face of the fiber to reach the photodiode 20.

When the first Fresnel reflection is detected by the photodiode 20, the counter 23 (which starts at zero) is incremented by 1. This value is compared at the comparator 25 with an electrical comparison reference signal in the form of a binary word encoding the value of N previously stored in the memory. Since N must be greater than 1, the output of the comparator 25 does not change and the counter 24 continues to operate under the effect of the pulses transmitted by the clock 13. Operation is the same up until the $N-1^{th}$ detected Fresnel reflection.

When the $N-1^{th}$ Fresnel reflection is detected by the photodiode 20, the comparator 25 enables the bistable 21. The $N+1^{th}$ reflection then inhibits the gate 22 and the counter 24 no longer receives the pulses transmitted by the clock 13. Consequently, the counter 24 stops after having recorded the lapse of time $t_1$ between the emission of the initial pulse and the detection of the $N+1^{th}$ Fresnel reflection. This value is then read by the microprocessor 26 which, since it knows the refractive index of the fiber under test and the length of the lead-in fiber, transforms the time $t_1$ into a length $l_1$ along the fiber. Before each activation, the counters are reset (i.e. reinitialized), thereby making the circuit available for taking a new measurement.

The essential role of the D-type bistable used is to give rise to a time delay defined by the time interval between the chosen Fresnel reflection and the preceding Fresnel reflection.

A plurality of other similar measurements (e.g. 10) may then be taken. The microprocessor keeps the values $t_1, ..., t_{10}$ in its memory, calculates the corresponding lengths $l_1, ..., l_{10}$, calculates the means and the standard deviations, and displays the two values. It may further signal an error when the standard deviation exceeds a limit value that is set initially. In this way, if the Fresnel reflection located corresponds to a faulty connector which sends back a different response at each measurement, the standard deviation exceeds the limit value and the apparatus signals an error, thereby enabling the faulty connection to be identified and repaired.

Besides this major improvement, the apparatus of the invention therefore enables a given Fresnel reflection (i.e. a connector, a fiber end, or a break) to be located without being hindered by any preceding Fresnel reflections as is the case with echometers. The apparatus of the invention further offers the known advantages of prior art echometers, i.e.:

fast measuring, in about one second, by means of a system operating in real time;

high distance resolution (the point giving rise to a Fresnel reflection is located to within about 25 cm);

low cost (about 10 times cheaper than a reflectometer); and compactness (comparable with that of an ordinary voltmeter).

Therefore, the first operating method enables a Fresnel reflection to be located relative to the front face of the optical fiber under test. For example, this enables the length of a fiber to be measured (by detecting the last Fresnel peak due to the rear face of the fiber). This measurement may be used intrinsically, or it may be compared with the known length of the fiber under test in order to determine whether or not there is break. By means of this system, it is possible to check both the positions of the reflective connectors and their conditions. The first operating method therefore enables absolute distances to be measured.

In a second operating method, relative distances can be measured, e.g. between two connectors, or between a connector and one of the end faces of the fiber.

In order to measure the distance between two points that have given rise to the $N+1^{th}$ and the $N+P^{th}$ ($P>1$) Fresnel reflection, the value N is entered in the memory of the microprocessor prior to measuring. Counting is performed as in the first operating method so as to determine the distance between the front face of the fiber and the point that gave rise to the $N+1^{th}$ Fresnel reflection. The result is then entered in the memory of the microprocessor 26. The value $N+P-1$ is then entered in the memory of the microprocessor and, as in the first operating method, the same processing is repeated to determine the distance between the front face of the fiber and the point that gave rise to the $N+P^{th}$ Fresnel reflection. This second value is also entered in the memory of the microprocessor 26. Finally, the microprocessor 26 calculates the distance between the points that gave rise to the $N+1^{th}$ and the $N+P^{th}$ Fresnel reflections by taking the difference between the two recorded values.

The advantages of the second operating method are identical to those of the first.

In both operating methods, it is necessary to enable the gate at the Fresnel reflection preceding the one to be located. Because of the reaction time of the various electronic components in the circuit, it is not possible to stop counting instantaneously at the reflection to be detected. Given the HF clock frequency which is about 200 MHz, this would introduce systematic error.

Naturally, the invention is not limited to the apparatus or to the operating methods described above.

In particular, in the second operating method, by using a more complex logic circuit than the D-type bistable, which logic circuit includes a counter, it is possible to measure the distance between the $N+1^{th}$ and the $N+P^{th}$ Fresnel reflection directly.

Finally, any of the means may be replaced by equivalent means without going beyond the ambit of the invention.

We claim:

1. A system for locating Fresnel reflections along an optical fiber (16), said system comprising:

emission means (11, 12, 17) for emitting optical pulses (10) which are coupled into the input face (14) of said fiber (16);

reception and transformation means (20) for receiving signals reflected by said fiber and transforming them into electrical signals;

selection means (20) for taking said electrical signals and selecting therefrom only those electrical signals which correspond to Fresnel reflections;

comparison means (23, 25, 26) coupled to said selection means (20) and receiving a comparison reference signal expressing the rank of an arbitrarily-chosen one of said Fresnel reflections; and evaluation means (13, 21, 22, 24, 26) coupled to said comparison means and to said selection means so as to locate the point along said fiber (16) that gave rise to said arbitrarily-chosen Fresnel reflection.

2. A system according to claim 1, in which said emission means comprises a laser (11) controlled by an electrical pulse generator (12), and an optical coupler (17) placed between said laser (11) and the input face (14) of said optical fiber (16), each pulse from said generator (12) further triggering the start of counting of a high-frequency clock (13).

3. A system according to claim 1, in which at said reception and transformation means (20), said selection means includes a minimum amplitude threshold which said electrical signals must exceed in order to be transmitted to said comparison means (23, 25, 26), said threshold being greater than the amplitude of the electrical signal corresponding to the maximum power of Rayleigh backscattering.

4. A system according to claim 1, in which said comparison means comprise a first counter (23) whose output is sent to a comparator (25), and a microprocessor (26) also connected to said comparator (25).

5. A system according to any one of claim 1, in which said evaluation means comprises:

a clock (13) transmitting its pulses to a gate (22) beginning with the first optical pulse;

a D-type bistable (21) whose data input (D) is connected to said reception and transformation means (20), whose clock input (C) for enabling the data state is connected to the output of said comparison means (23, 25, 26), and whose output is applied to said gate (22); and a counter (24) whose input is connected to said gate (22) and whose output is connected to a microprocessor (26).

6. A system according to claim 4, in which in order to locate said arbitrarily-chosen Fresnel reflection, the rank N of the Fresnel reflection preceding said chosen Fresnel reflection is entered and encoded in the form of a binary word in said microprocessor (26), so that, with a gate (22) being open since the first optical pulse was emitted:

when said $N^{th}$ Fresnel reflection is detected, said comparator (25) enables a D-type bistable;

when said $N+1^{th}$ Fresnel reflection is detected, the corresponding electrical signal inhibits said gate (22), thereby stopping a second counter (24) which then transmits the number of clock-pulses it has received since the start to said microprocessor (26), the microprocessor (26) then calculating the distance between the input face (14) of said fiber and the point that gave rise to said chosen Fresnel reflection.

7. A system according to claim 6, in which said microprocessor includes auxiliary means for locating a new Fresnel reflection of rank $N+P$ after having located said $N+1^{th}$ Fresnel reflection, by repeating the processing for the rank $N+P$ of the new Fresnel reflection, and by then determining by subtraction the distance between the points that gave rise to said chosen $N+1^{th}$ and $N+P^{th}$ Fresnel reflections.

8. A system according to claim 1, in which a lead-in optical fiber (15) of known length is coupled to said input face of said optical fiber (16) and receives said optical pulses (10) which it transmits to said optical fiber (16).

9. A system according to claim 2, in which said HF clock (13) is a quartz clock.

10. A system according to claim 1, in which said reception and transformation means (20) are constituted by a photodiode.

11. A system according to claim 1, in which said reception and transformation means (20) are equipped with a threshold amplifier for performing said selection.

12. A system according to claim 1, in which said system includes a sub-system for averaging a plurality of consecutive measurements.

13. A system according to claim 1, in which said system includes means for effecting general resetting before each new optical impulse is emitted.

* * * * *